United States Patent
Kumagai et al.

(10) Patent No.: US 6,600,579 B1
(45) Date of Patent: Jul. 29, 2003

(54) IMAGE READING APPARATUS

(75) Inventors: Makoto Kumagai, Toyokawa (JP); Katsuaki Tajima, Toyokawa (JP); Hidekazu Takahama, Nagoya (JP); Taisuke Akahori, Toyokawa (JP); Hideaki Mizuno, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 601 days.

(21) Appl. No.: 09/584,689

(22) Filed: Jun. 1, 2000

(30) Foreign Application Priority Data

Jun. 4, 1999 (JP) .............................. 11-157632

(51) Int. Cl.$^7$ ............................................. H04N 1/04
(52) U.S. Cl. ...................... 358/474; 358/461; 358/486; 358/496; 358/498
(58) Field of Search ................. 358/461, 486, 358/498, 474, 488, 406, 504, 463, 296, 401; 382/274; 399/9, 11, 16, 17, 14, 34, 207

(56) References Cited

U.S. PATENT DOCUMENTS

| | | | | |
|---|---|---|---|---|
| 5,055,935 A | * | 10/1991 | Ohno | 358/296 |
| 5,101,284 A | * | 3/1992 | Tanabe | 358/461 |
| 5,644,409 A | * | 7/1997 | Irie et al. | 358/461 |
| 6,295,383 B1 | * | 9/2001 | Smitt et al. | 382/274 |
| 6,522,431 B1 | * | 2/2003 | Pitts et al. | 358/474 |

FOREIGN PATENT DOCUMENTS

| | | | | |
|---|---|---|---|---|
| JP | 363153680 A | * | 6/1988 | |
| JP | 402180463 A | * | 7/1990 | |
| JP | 6-164833 | | 6/1994 | |
| JP | 406189074 A | * | 7/1994 | |
| JP | 408168002 A | * | 6/1996 | |
| JP | 9-9011 | | 1/1997 | |
| JP | 9-83703 | | 3/1997 | |
| JP | 10-56542 | | 2/1998 | |
| JP | 10-190934 | | 7/1998 | |
| JP | 02001186312 A | * | 7/2001 | |
| JP | 02001285536 A | * | 10/2001 | |

* cited by examiner

*Primary Examiner*—Cheukfan Lee
(74) *Attorney, Agent, or Firm*—McDermott, Will & Emery

(57) ABSTRACT

During reading process, an image reading unit read a white pressing plate (reference member) under a state where no original exists between the white pressing plate and an original glass plate. On the basis of the read image data, it is judged whether dirt is detected on the glass plate or not. If dirt is detected, a page in which a black line appears is determined. Information of the page is displayed on a display section. An original of the page is reread by the image reading unit.

17 Claims, 13 Drawing Sheets

IMAGE READING APPARATUS

This application is based on application No. 11-157632 filed in Japan, the contents of which is hereby incorporated by reference.

BACKGROUND OF THE INVENTION

1. Field of the Invention

The present invention relates to an image reading apparatus, and more particularly to an image reading apparatus which reads an image on an original while moving the original with respect to a reading section.

2. Description of the Related Art

Conventionally, an image reading apparatus used in a digital copier or the like employs a technique of reading an image on an original by means of so-called follow shot. In this technique, an image is read while moving an original with respect to a fixed reading section. This technique has the merits that the structure and control of the reading apparatus can be simplified, and that an image can be read at a high speed.

However, the technique has the following problem. When dirt such as dust or a scratch exists in a reading position, the reading section continues to read the dirt during the entire process of moving the original, with the result that a black line appears not only in an read image but also in an output image.

In view of the problem, a technique that dirt on an original glass plate in a reading position is detected and an alarm is then given is disclosed in Japanese Patent Publications (Kokai) Nos. HEI10-56542 and HEI9-83703.

In the technique of the conventional art, however, a countermeasure against dirt which is deposited to a reading position during a reading process is not taken. Therefore, the technique has a problem in that a black line due to dirt deposited to a reading position during a reading process cannot be prevented from appearing in an image.

SUMMARY OF THE INVENTION

It is an object of the invention to provide an image reading apparatus in which a black line due to, for example, dirt deposited to a reading position during a reading process can be prevented from appearing in an image.

In order to attain the object, an image reading apparatus of a first feature is an image reading apparatus which reads each of originals that are sequentially transported one by one, the image reading apparatus comprising: a reading unit which reads a transported original; a reference member; detecting means for detecting dirt in the reading unit by reading the reference member; and determining means for, among plural originals read by the reading unit, determining one or more originals on the basis of a detection result of the detecting means, image data which are read from the determined originals being affected by the dirt.

An image reading apparatus of a second feature is an image reading apparatus which reads each of originals that are sequentially transported one by one, the image reading apparatus comprises: a reading unit which reads a transported original in a reading position; a reference member; detecting means for detecting dirt in the reading unit by reading the reference member; and a rereading controller which changes the reading position of the reading unit on the basis of a detection result, of the detecting means, and rereading an original that has been once read.

An image reading method of a third feature is a method of reading an image on originals, and comprises the steps of: reading originals that are sequentially transported by a reading unit; detecting dirt in the reading unit by reading a reference member; determining one or more originals among plural originals based on a detection result of the detection step, image data which are read from the determined originals being affected by the dirt; and rereading the determined original.

An image reading method of a fourth feature is a method of reading images on plural originals, and comprises the steps of: reading originals that are sequentially transported by a reading unit; detecting dirt in the reading unit by reading a reference member; determining one or more originals among plural originals based on a detection result of the detection step, image data which are read from the determined originals being affected by the dirt; and rereading the determined original.

According to these features, it is possible to prevent a black line due to dirt deposited during a process of reading an original, from appearing in an image.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Figure 1:
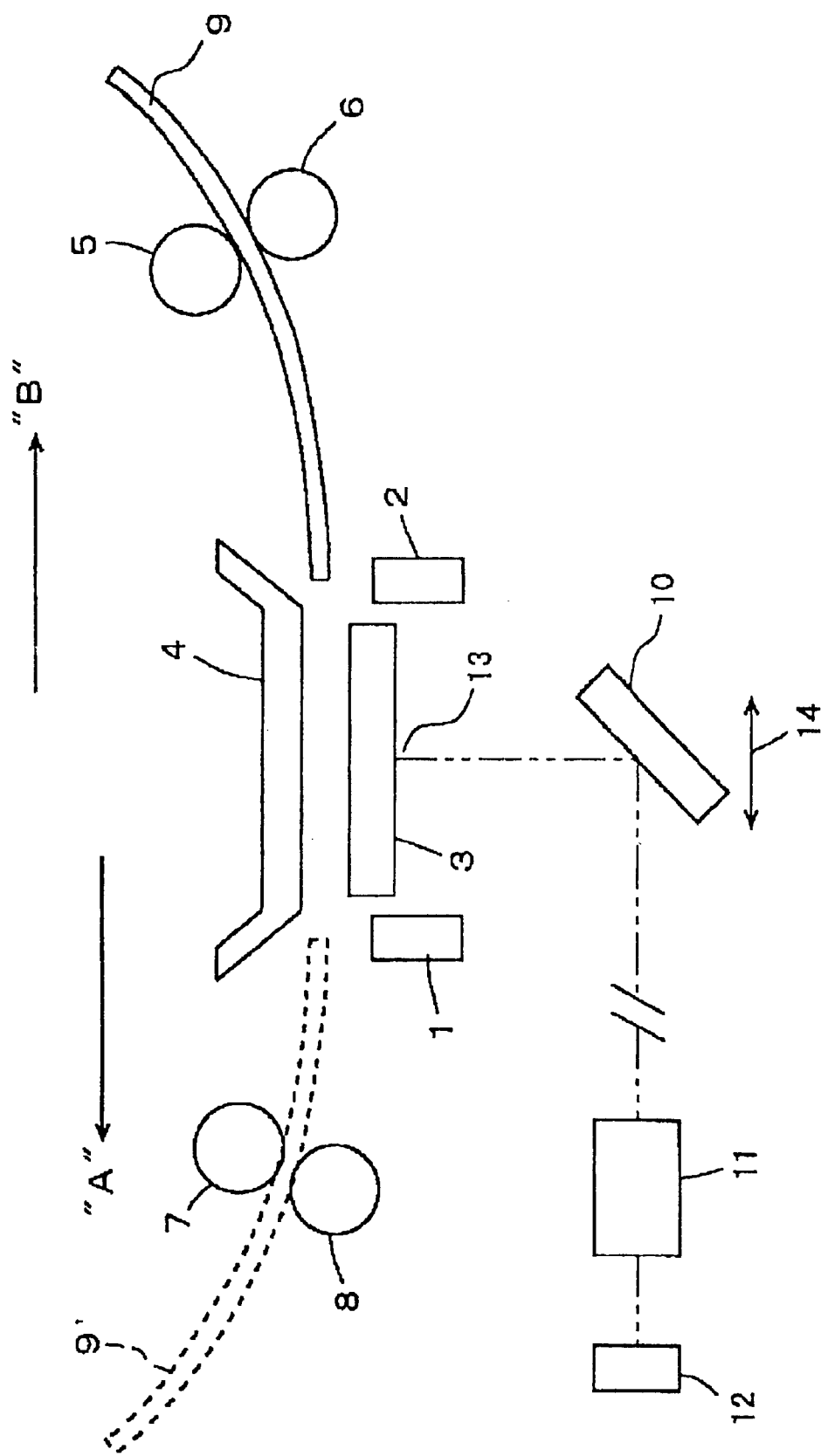
FIG. 1 is a side view showing the configuration of an image reading apparatus of a first embodiment of the invention.

FIG. 1 is a side view showing the configuration of an image reading apparatus of a first embodiment of the invention.

Referring to the figure, the image reading apparatus comprises: upstream original transport rollers 5 and 6 which sequentially send plural originals one by one to a reading position 13; an upstream original position detection sensor 2 which detects sending of an original in the upstream of the reading position 13; an original glass plate 3; a white pressing plate (a correcting plate or a reference section) 4 which is disposed in a position opposed to the original glass plate 3; a downstream original position detection sensor 1 which detects sending of an original in the downstream of the reading position; downstream original transport rollers 7 and 8 which transport an original that has been read; a reflecting mirror 10 which reflects light from an original through the original glass plate 3; a lens 11 which converges the light from the reflecting mirror 10; and a CCD imaging sensor 12 which reads the light from the lens 11.

An image reading unit includes the original glass plate 3, the reflecting mirror 10, the lens 11 and the CCD imaging sensor 12. The image reading apparatus comprises the image reading unit.

An illumination lamp (fluorescent lamp) 109 which illuminates the original is not shown in the figure. The original glass plate 3, the reflecting mirror 10, the converging lens 11, and the CCD imaging sensor 12 constitute a reading section.

Figure 2:
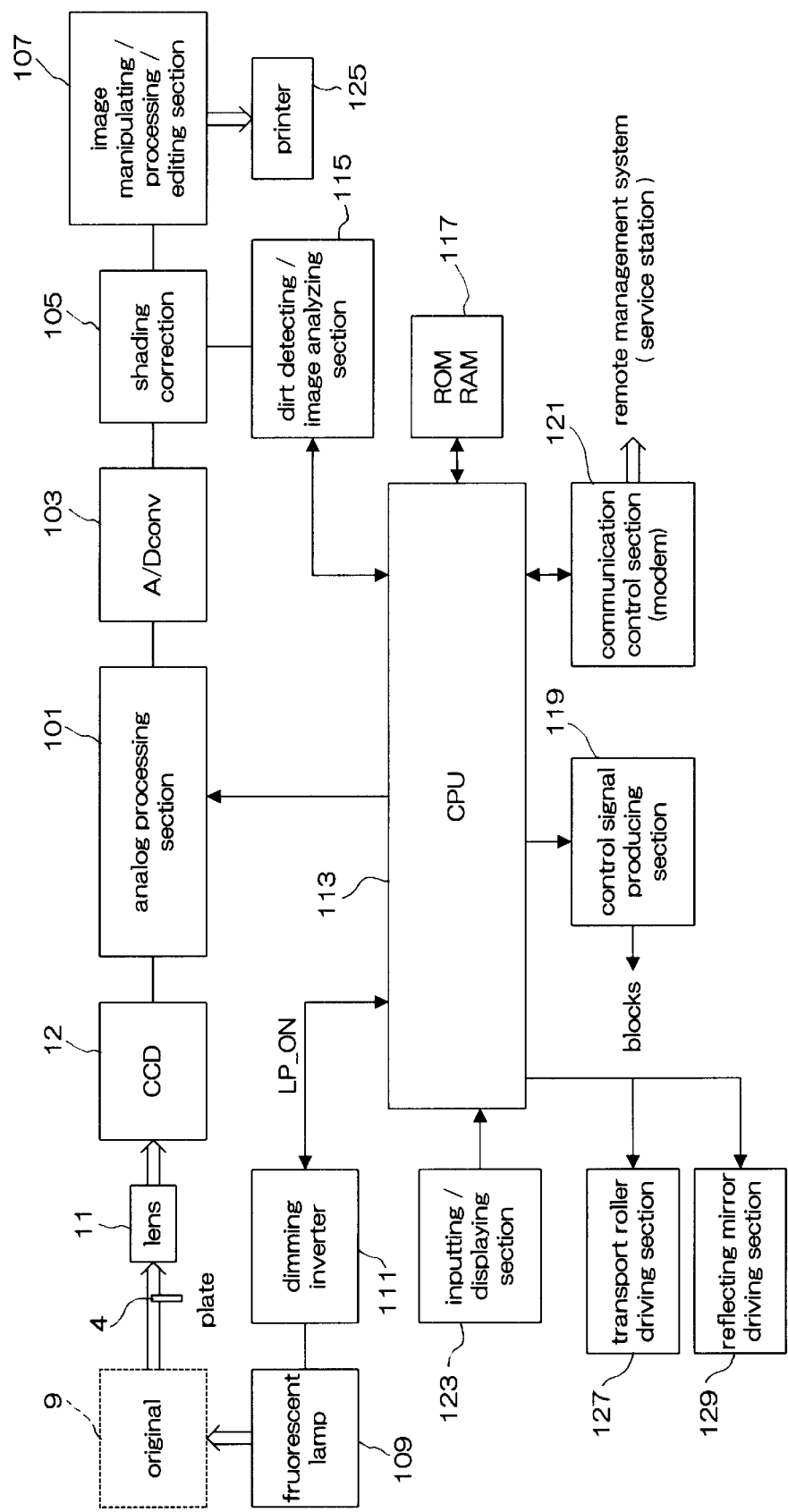
FIG. 2 is a block diagram showing the circuit configuration of the image reading apparatus of FIG. 1.

The reflecting mirror 10 can be moved in the direction of an arrow 14 by a reflecting mirror driving section 129 (see FIG. 2).

The upstream original transport rollers 5 and 6, and the downstream original transport rollers 7 and 8 are driven by a transport roller driving section 127 (see FIG. 2) including a motor. During a usual original reading process, one original 9 is transported in the direction indicated by "A". When the upstream original transport rollers 5 and 6, and the downstream original transport rollers 7 and 8 are reversely rotated, an original 9' that has been once read can be transported in the direction indicated by "B".

The downstream original transport rollers 7 and 8 are configured so as to be movable in the axial direction. The downstream original transport rollers 7 and 8 are driven in the axial direction by the transport roller driving section 127, so that the output position of an original that has been read can be changed (shifted).

FIG. 2 is a block diagram showing the circuit configuration of the image reading apparatus.

Referring to the figure, the image reading apparatus comprises: a CPU 113 which controls the whole of the apparatus; an analog processing section 101 which analog processes a signal from the CCD imaging sensor 12; an A/D converter 103 which converts an output signal of the analog processing section 101 into a digital signal; a shading correcting section 105 which performs the shading correction on an output of the A/D converter 103; and an image manipulating/processing/editing section 107 which manipultes, processes, and edits an image data that has undergone the shading correction. An image data output from the image manipulating/processing/editing section 107 is sent to a printing section 125, and an image is printed onto a sheet on the basis of the image data. The image reading apparatus further comprises: the fluorescent lamp 109 which illuminates the original 9; a dimming inverter 111 which controls the fluorescent lamp 109; a dirt detecting/image analyzing section 115 which detects dirt in the reading position 13 on the basis of a data which has undergone the shading correction; and an inputting/displaying section 123 through which the user inputs various constants, and which performs a display operation; a ROM/RAM 117 which stores programs and constitutes a work area for implementing the programs; a control signal producing section 119 which produces control signals for blocks; a communication controlling section (modem) 121 which performs communications with a remote management system (service station); the transport roller driving section 127; and the reflecting mirror driving section 129.

Figure 3:
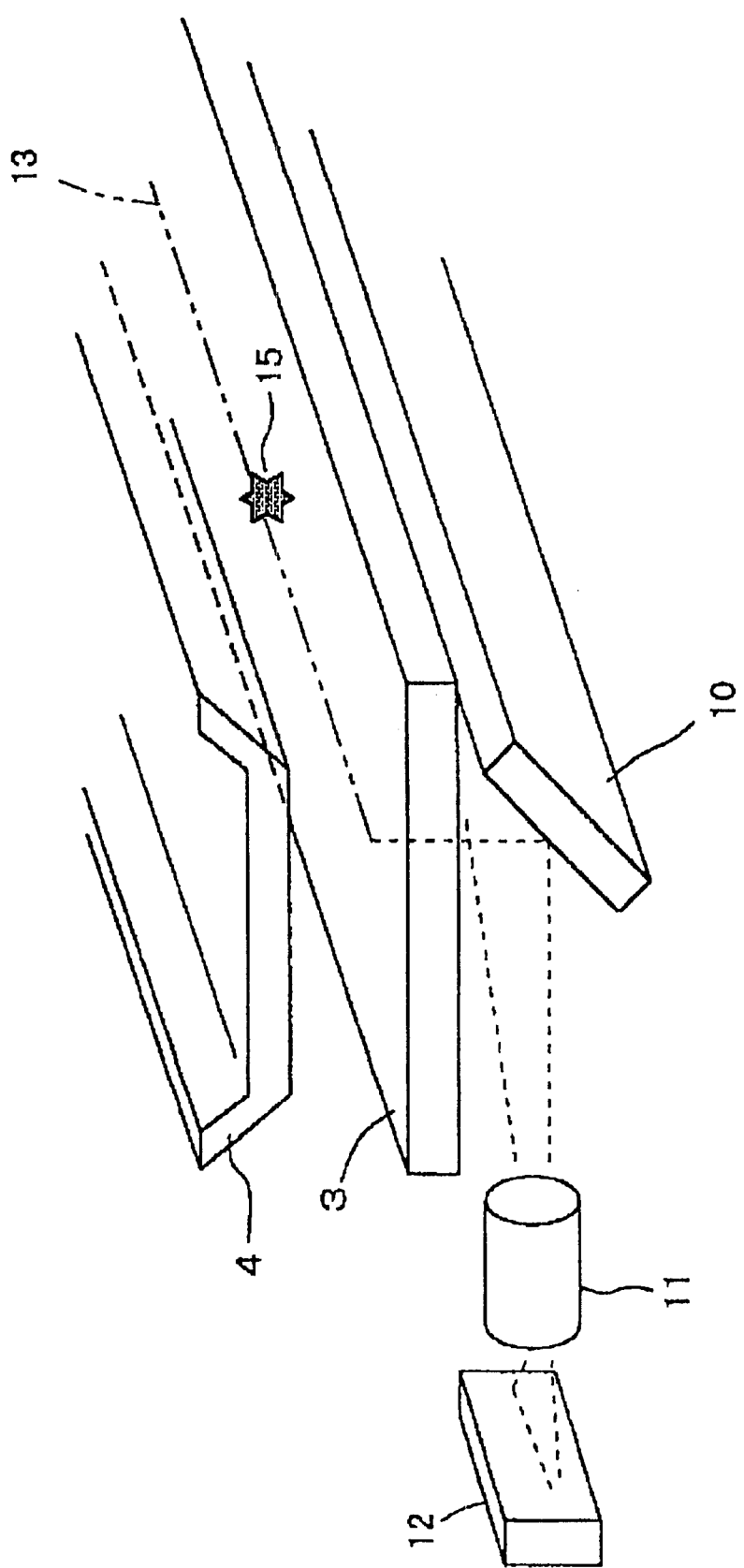
FIG. 3 is a perspective view showing a state where dirt 15 exists on an original glass plate 3.

FIG. 3 is a perspective view of the image reading apparatus and illustrating a state where dirt 15 exists in the reading position 13 on the original glass plate 3.

As shown in the figure, when, under a state where no original exists between the original glass plate 3 and the white pressing plate 4, the CCD imaging sensor 12 reads the white pressing plate 4 through the original glass plate 3, it is possible to detect the existence of the dirt 15.

Figure 4:
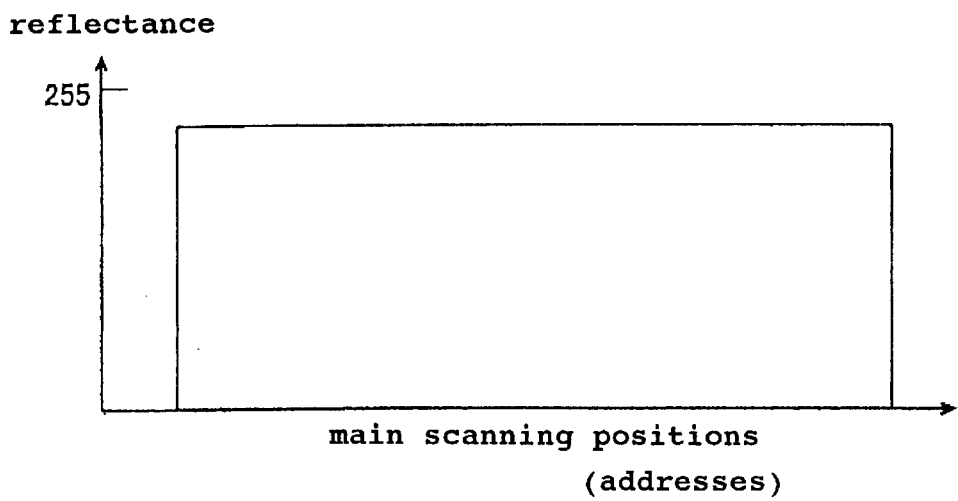
FIG. 4 is a view showing an output of a CCD imaging sensor in the case where no dirt exists.

In the case where the dirt 15 does not exist in the reading position 13, when the white pressing plate 4 is read, the output of the CCD imaging sensor 12 after the shading correction shows the same reflectance in the all main scanning positions (addresses) as shown in FIG. 4.

Figure 5:
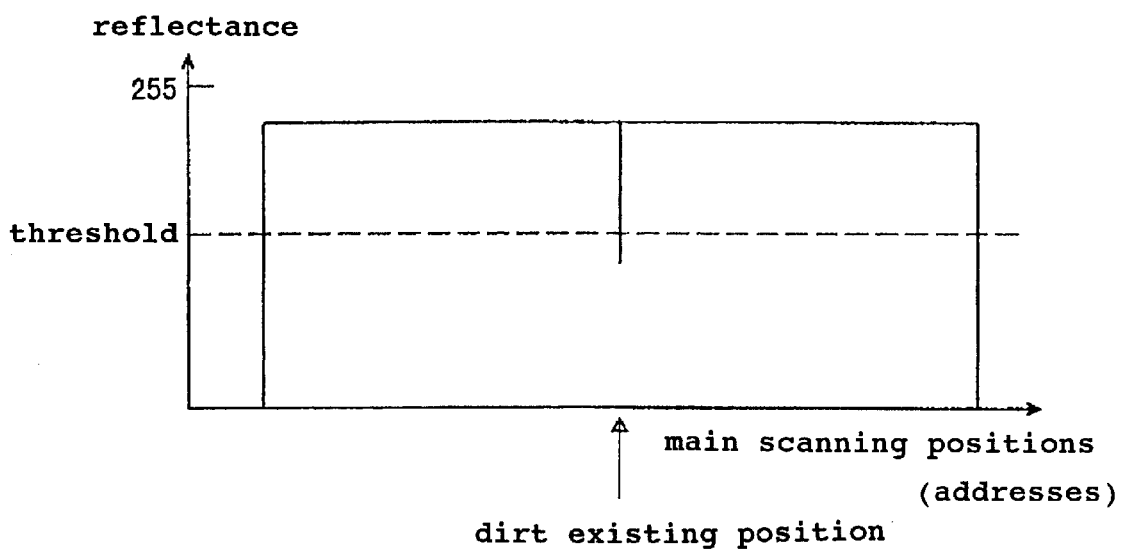
FIG. 5 is a view showing an output of the CCD imaging sensor in the case where dirt exists.

By contrast, in the case where the dirt 15 exists in the reading position 13, the reflectance in the position where the dirt exists is reduced as shown in FIG. 5. The dirt detecting/image analyzing section 115 can detect the existence of the dirt by judging the reduction of the reflectance with respect to a threshold. Alternatively, a histogram showing relationships between a reflectance and the number of pixels exhibiting the reflectance may be produced, and, when there is a pixel exhibiting a reflectance which is smaller than a threshold, it may be judged that dirt exists.

Figure 6:
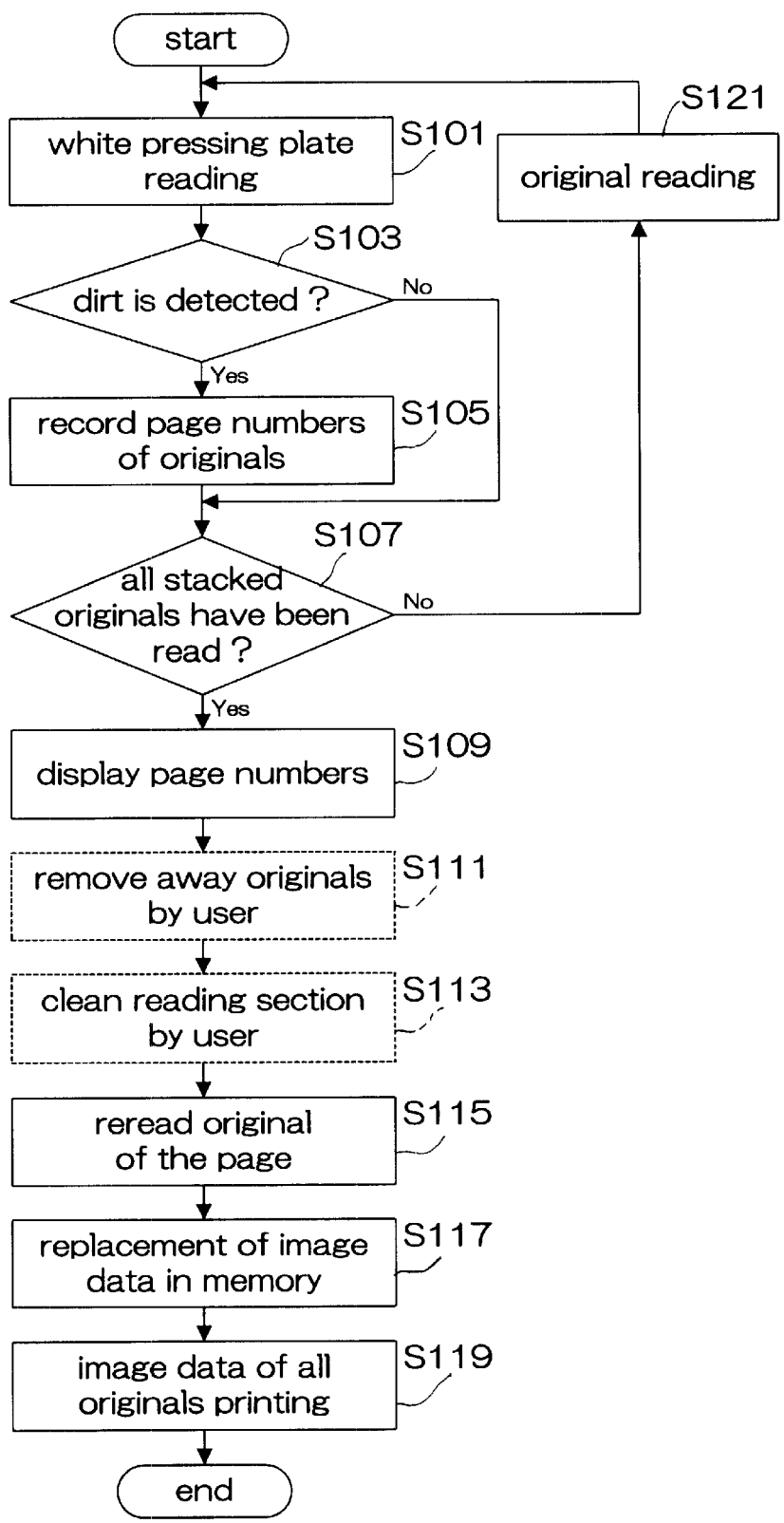
FIG. 6 is a flowchart showing processes of the image reading apparatus of the first embodiment.

FIG. 6 is a flowchart showing the operation of the image reading apparatus of the embodiment.

Referring to the figure, in step S101, the CCD imaging sensor 12 reads an image data of the white pressing plate 4 under a state where no original exists between the original glass plate 3 and the white pressing plate 4.

On the basis of the read image data, it is judged in step S103 whether dirt is detected in the reading position 13 or not. If dirt is detected, the page numbers of originals between which the reading of the white plate is performed are recorded in step S105.

With respect to a page in which it is judged from the result of the dirt detection that a black line appears, the position to which the original is to be discharged may be changed so that the page in which a black line appears can be easily known.

It is judged in step S107 whether all of the stacked originals have been read or not. If there is an original which has not yet been read, the next original is read in step S121, and the control then returns to step S101.

If it is judged in step S107 that there is no original which has not yet been read, the page in which a black line appears is identified in step S109 on the basis of the page numbers of the originals which have been stored in step S105. Information of the page is displayed on the displaying section 123.

The user removes away in step S111 the originals which have been read, and cleans the reading section in step S113.

Next, the user again sets the original of the page which is displayed, to the image reading apparatus. The original of the page in which a black line appears is reread in step S115.

In step S117, the image manipulating/processing/editing section 107 performs replacement of the image data of the page which is read in step S115, and that of the same page which is read in step S121. Specifically, the image data of the page which is stored in a memory is deleted, and that of the page which is newly read is stored. The image data of all pages are printed out in step S119 via the printing section 125.

Figure 7:
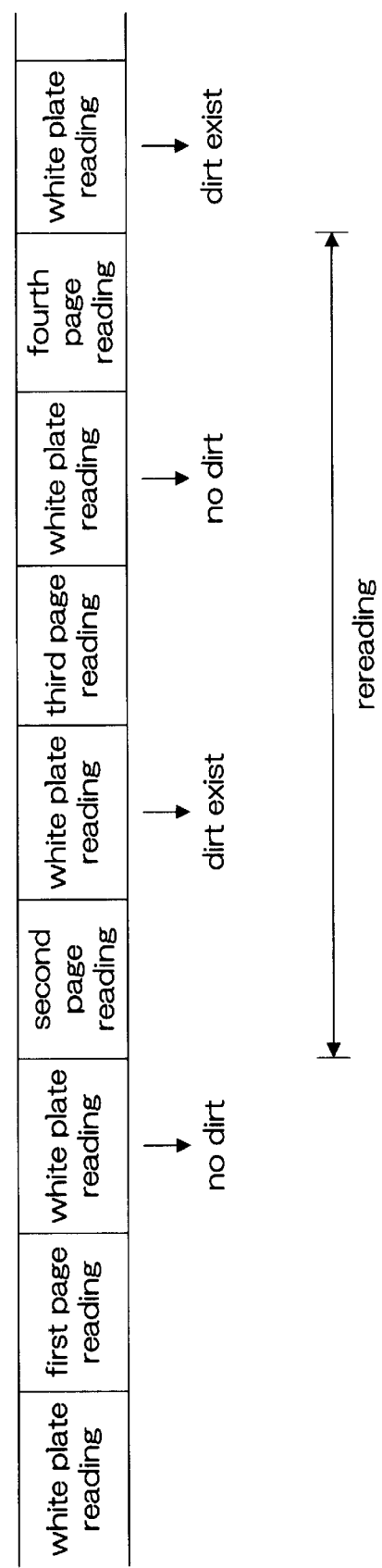
FIG. 7 is a view illustrating identification of an image in which a black line appears.

FIG. 7 is a view of a specific example of determining a page to be displayed, or a page in which a black line appears.

For example, the following situation will be considered. When four originals are read, it is judged in the white plate reading after the first original is read, that no dirt exists, it is judged in the white plate reading after the second original is read, that dirt exists, it is judged in the white plate reading after the third original is read, that dirt exists, and it is judged in the white plate reading after the fourth original is read, that no dirt exists.

In this case, the image reading apparatus displays that the second to fourth originals (second to fourth pages) must be reread, to request the user to perform rereading.

Figure 8:
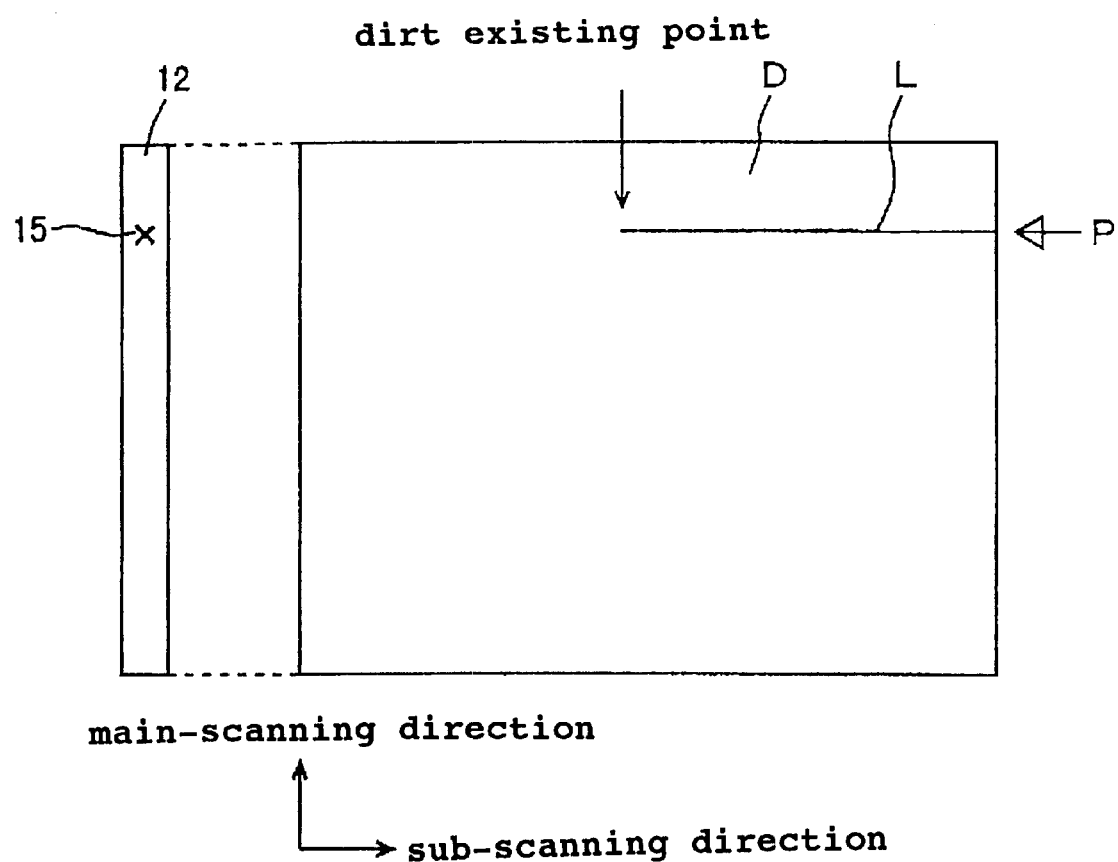
FIG. 8 is a view showing an image data in the case where dirt is deposited to a reading position during a process of reading an original.

The above display is conducted because of the following reason. At the timing when reading of the second original is ended, it is judged that dirt exists. Therefore, it seems that, as shown in FIG. 8, the dirt 15 is deposited to the reading position in the course of reading the image data of the second original. Consequently, the image data of the second original can be deemed as a data in which a black line L appears from an intermediate position in the subscanning direction.

Figure 9:
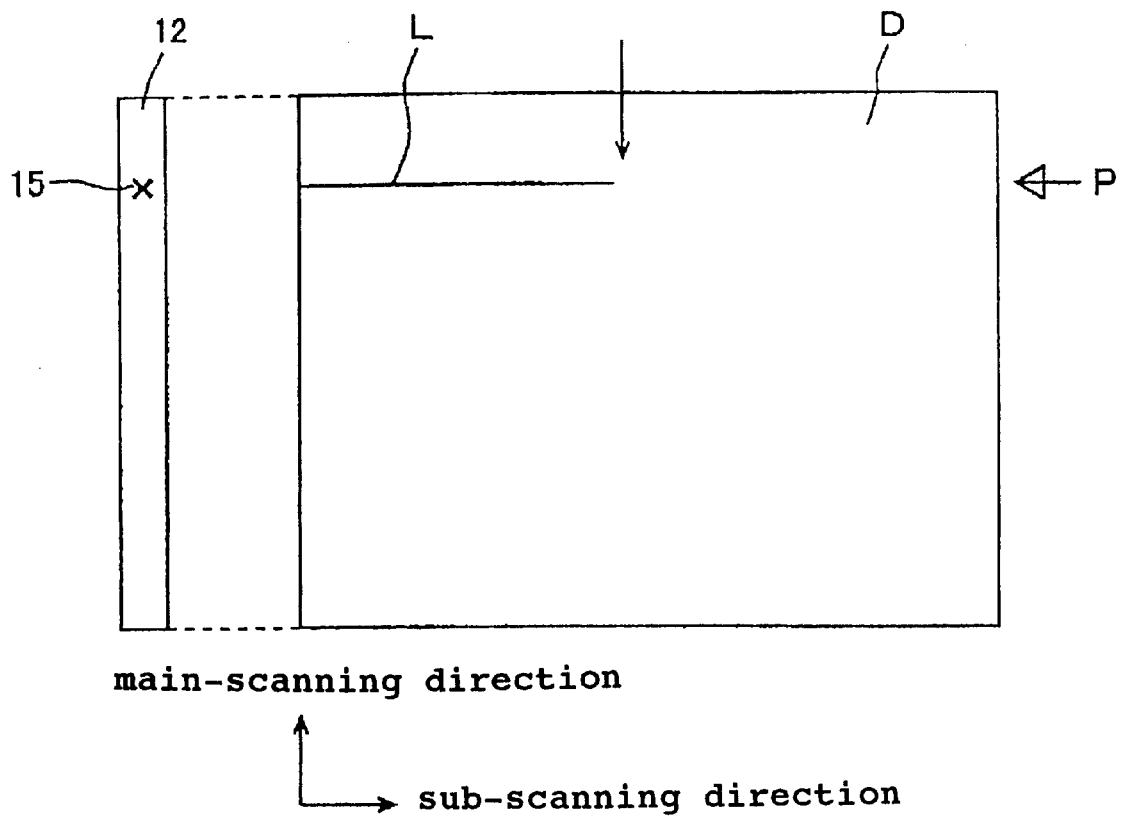
FIG. 9 is a view showing an image data in the case where dirt in the reading position vanishes during a process of reading an original.

When reading of the fourth original is ended, it is judged that no dirt exists. This shows that, as shown in FIG. 9, the dirt 15 vanishes in the course of reading the image data of the fourth original. Therefore, the black line L seems to appear in a part of the image data of the fourth original.

In this way, an image data in which a black line appears is subjected to rereading. In the embodiment, consequently, it is possible to obtain an image data which is free from a black line. Since the pages which must be reread are displayed after all of the originals are read, the burden on the user can be reduced.

Second Embodiment

An image reading apparatus of a second embodiment is configured in the same manner as that of the first embodiment, and hence description of its configuration is omitted.

Figure 10:
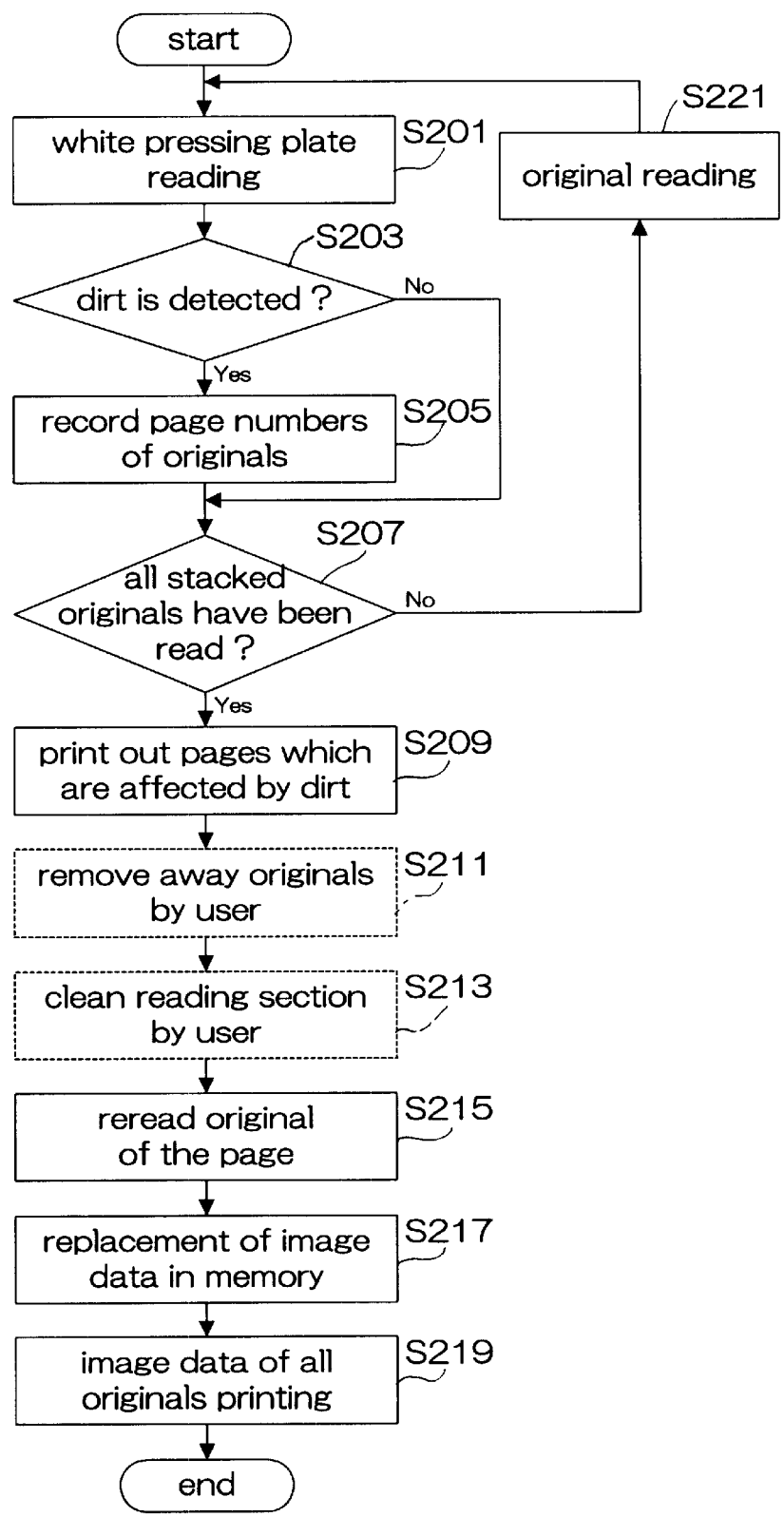
FIG. 10 is a flowchart showing processes of an image reading apparatus of a second embodiment.

In the second embodiment, a flowchart shown in FIG. 10 is implemented in place of the flowchart shown in FIG. 6. Steps S201 to S207 and S211 to S221 in FIG. 10 are respectively identical with steps S101 to S107 and S111 to S121 in FIG. 6, and hence their description is omitted.

In the embodiment, after reading of the stacked originals is ended, the image data of the pages (the second to fourth pages in FIG. 7) which are affected by dirt are printed out in step S209. The printing of the defect pages may be performed during the reading process. When the user sees the print result, the user can check the result of the actual image output. If it is determined that rereading must be performed, the user removes away the originals and then cleans the reading section (S211 and S213). The page in which a black line appears is reread (S215), and the image data in which a black line appears is replaced with the newly read one (S217).

When the user sees the output result of step S209 and judges that the output does not produce a serious problem, the user may perform an input operation such as pressing of a start key through the inputting/displaying section 123 so that the stored image data is printed out.

Third Embodiment

An image reading apparatus of a third embodiment is configured in the same manner as that of the first embodiment, and hence description of its configuration is omitted.

Figure 11:
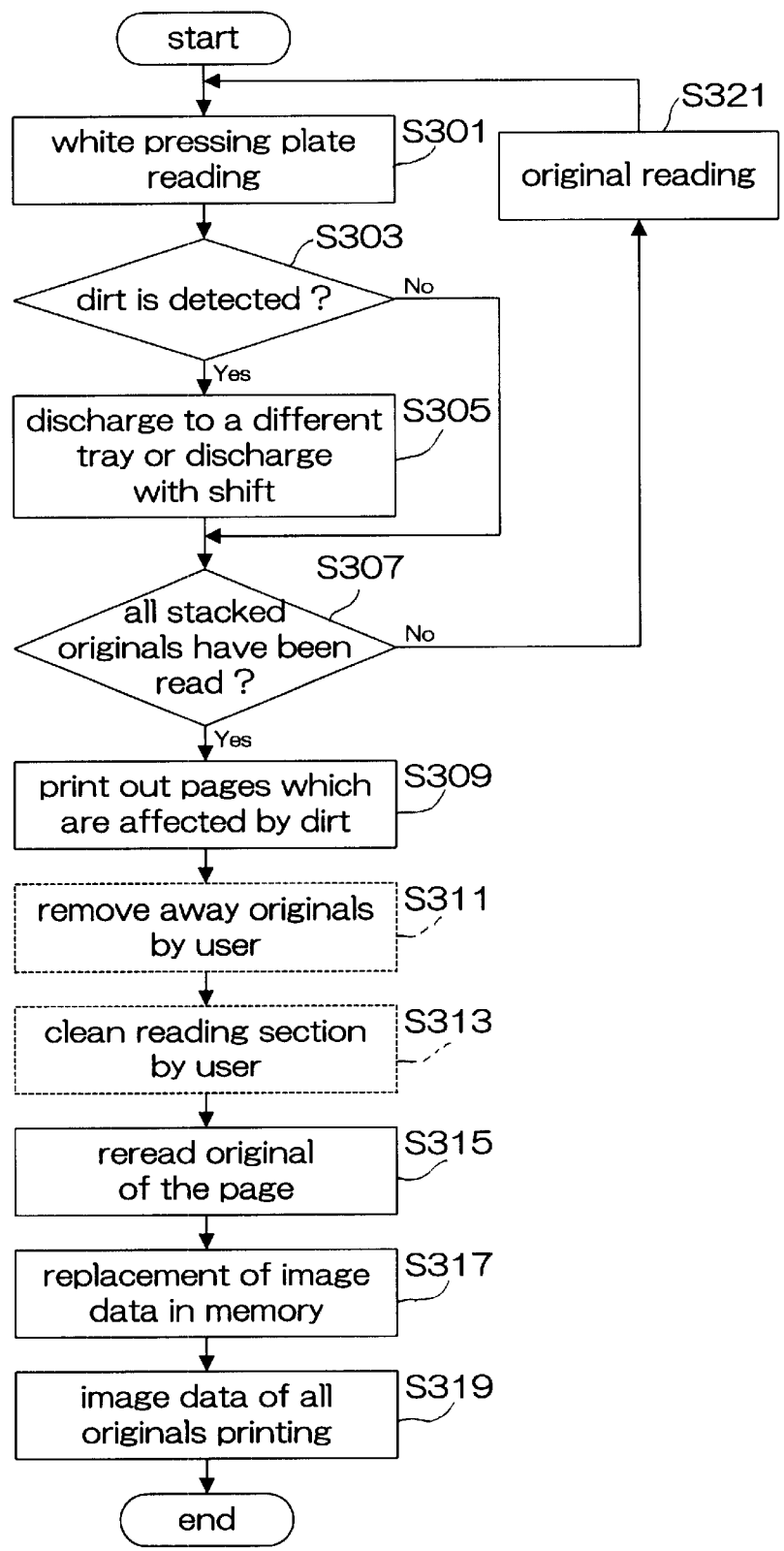
FIG. 11 is a flowchart showing processes of an image reading apparatus of a third embodiment.

In the image reading apparatus of the third embodiment, a flowchart shown in FIG. 11 is implemented in place of the flowchart shown in FIG. 6. Steps S301, S303, and S307 to S321 in the flowchart of FIG. 11 respectively correspond to steps S201, S203, and S207 to S221 in FIG. 10, and hence their description is omitted.

The embodiment is characterized in that, in place of the process in step S205 in the second embodiment (FIG. 10), a process is performed in which an original an image of which seems to contain a black line due to dirt is discharged to a position different from that where other originals are to be discharged (S305). The process is performed by moving the downstream original transport rollers 7 and 8 of FIG. 1 in the axial direction, so that the original is discharged while being shifted to the position which is different from the usual original discharging position. A dedicated tray may be prepared, and the original an image data of which seems to contain a black line may be discharged to the tray.

In the embodiment, the user can see the original which is discharged with being shifted (or the original discharged to the dedicated tray), so that the user can know the original an image data of which contains a black line. Therefore, the image of the original can be reread.

Fourth Embodiment

An image reading apparatus of a fourth embodiment is configured in the same manner as that of the first embodiment, and hence description of its configuration is omitted. In the image reading apparatus of the embodiment, a flowchart shown in FIG. 12 is implemented in place of the flowchart shown in FIG. 6.

Figure 12:
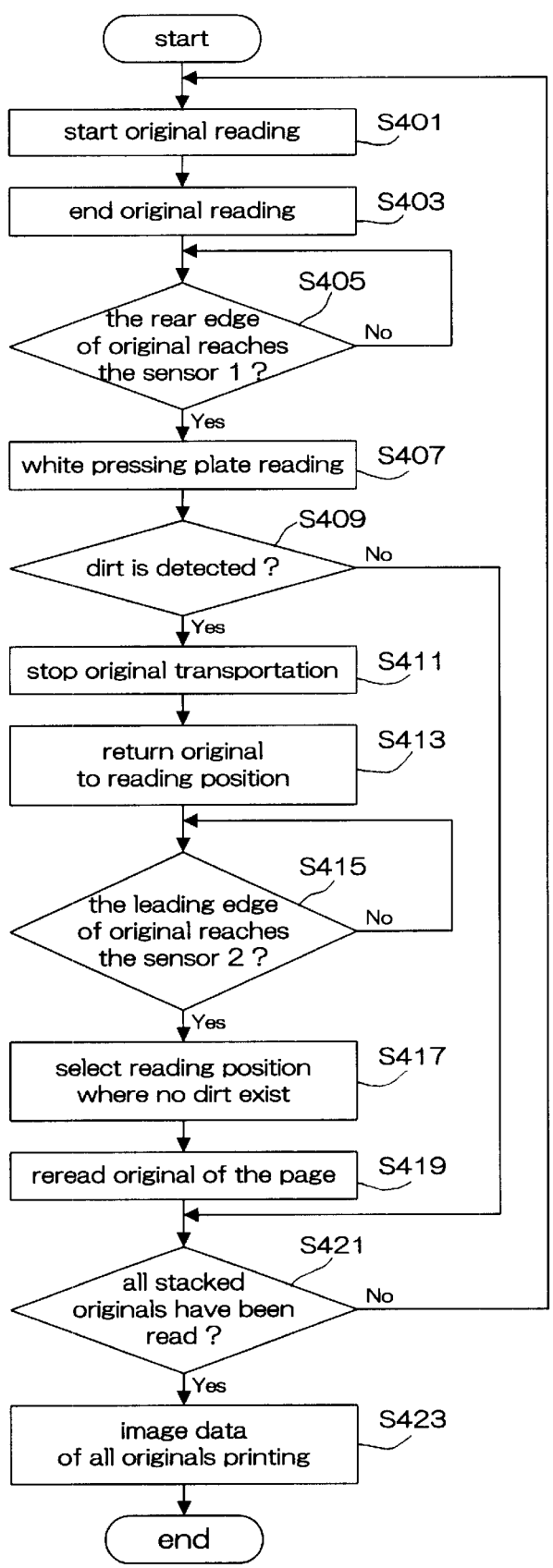
FIG. 12 is a flowchart showing processes of an image reading apparatus of a fourth embodiment.

Referring to FIG. 12, reading of one original is started in step S401. When the reading of the original is ended in step S403, it is judged whether the rear edge of the original reaches the downstream original position detection sensor 1 or not (S405). If the edge reaches the sensor, the CCD imaging sensor 12 reads the white pressing plate 4 in step S407.

On the basis of a result of the reading, it is judged in step S409 whether dirt is detected or not. If YES, the transportation of the original is stopped in step S411. The downstream original transport rollers 7 and 8, and the upstream original transport rollers 5 and 6 are reversely rotated in step S413, whereby the original is returned to the former reading position (the position which is denoted by a reference number 9 in FIG. 1).

It is judged in step S415 whether the leading edge of the original reaches the upstream original position detection sensor 2 or not. If YES, a reading position where no dirt exists is selected in step S417 by moving the reflecting mirror 10 in the direction of the arrow 14 in FIG. 1.

Thereafter, the returned original is reread in step S419.

It is judged in step S421 whether all of the stacked originals have been read or not. If all the originals have been read, the copy outputs of all the originals are performed in step S423, and the routine is then ended.

If no dirt is detected in step S409, the control proceeds to step S421. If it is judged in step S421 that there is an original, the control returns to step S401.

As described above, an original an image data of which contains a black line due to dirt is reread while changing the reading position. Therefore, it is possible to obtain an image data which does not contain a black line. The process of step S417 may be performed after that of step S411.

Fifth Embodiment

An image reading apparatus of a fifth embodiment is configured in the same manner as that of the first embodiment, and hence description of its configuration is omitted.

Figure 13:
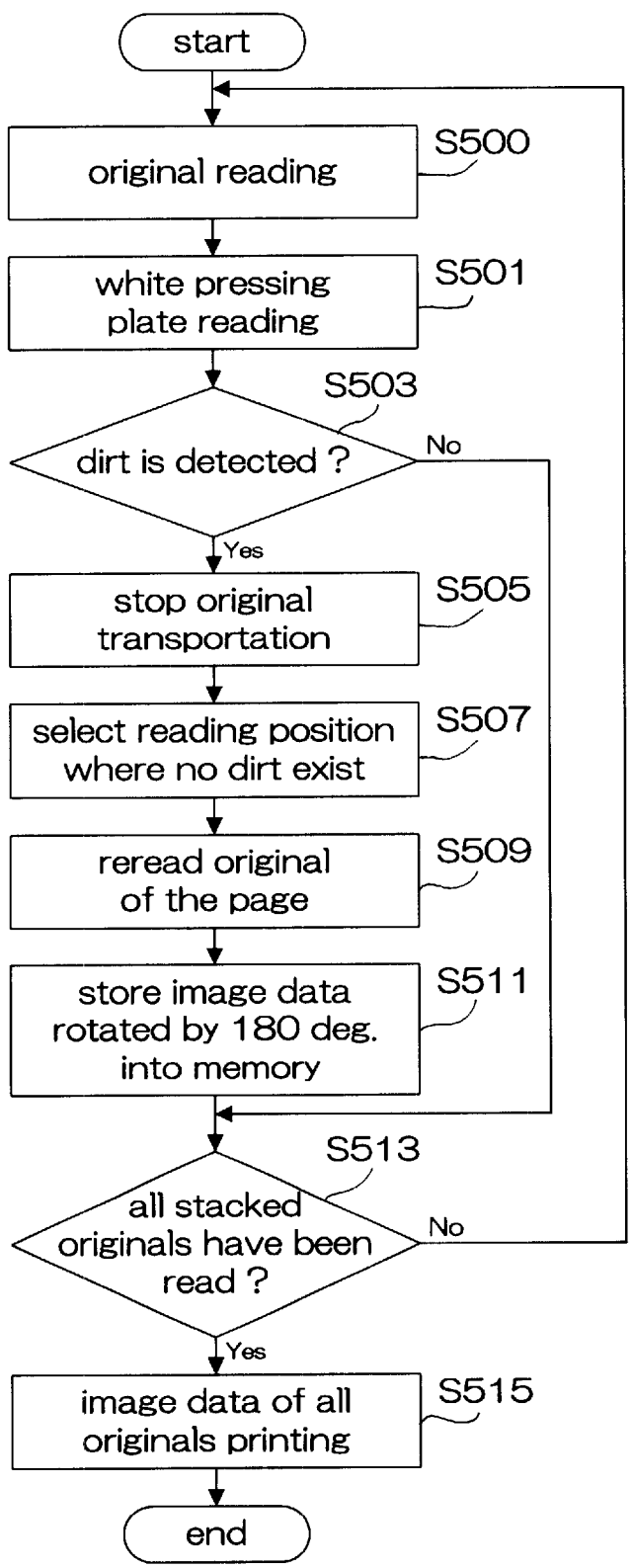
FIG. 13 is a flowchart showing processes of an image reading apparatus of a fifth embodiment.

In the fifth embodiment, a flowchart shown in FIG. 13 is implemented in place-of the flowchart shown in FIG. 6.

Referring to FIG. 13, an original is read in step S500, and the white pressing plate is read in step S501. On the basis of a result of the reading, it is judged in step S503 whether dirt is detected or not. If there is dirt, the transportation of the original is stopped in step S505. Thereafter, a reading position where no dirt exists is selected in step S507 by moving the reflecting mirror 10 in the direction of the arrow 14 in FIG. 1. In step S509, the image data of the original is read by using the CCD imaging sensor 12 while the original is returned to the position where the original is situated before reading, by reversely rotating the downstream original transport rollers 7 and 8, and the upstream original transport rollers 5 and 6. The direction of the image data which is obtained at this time is opposite to that in a usual reading. Therefore, the obtained image data is rotated in step S511 by 180 deg. and then stored into the image manipulating/processing/editing section 107.

It is judged in step S513 whether all of the stacked originals have been read or not. If YES, the copy outputs of all the originals are performed in step S515.

If no dirt is detected in step S503, the control proceeds to step S513.

If NO in step S513, the control returns to step S500.

As described above, in the embodiment described above, dirt is detected after an original is read by the reading section, and, on the basis of a result of the detection, the original which has been read is reread. Therefore, it is possible to obtain an image data which is free from a black line.

The rotation of an image data may be performed by using a line buffer memory, or by storing a read image data into a mass storage memory such as a page memory, a hard disk, or the like, and then reading out the data in the direction opposite to that in the storing.

Figure 14:
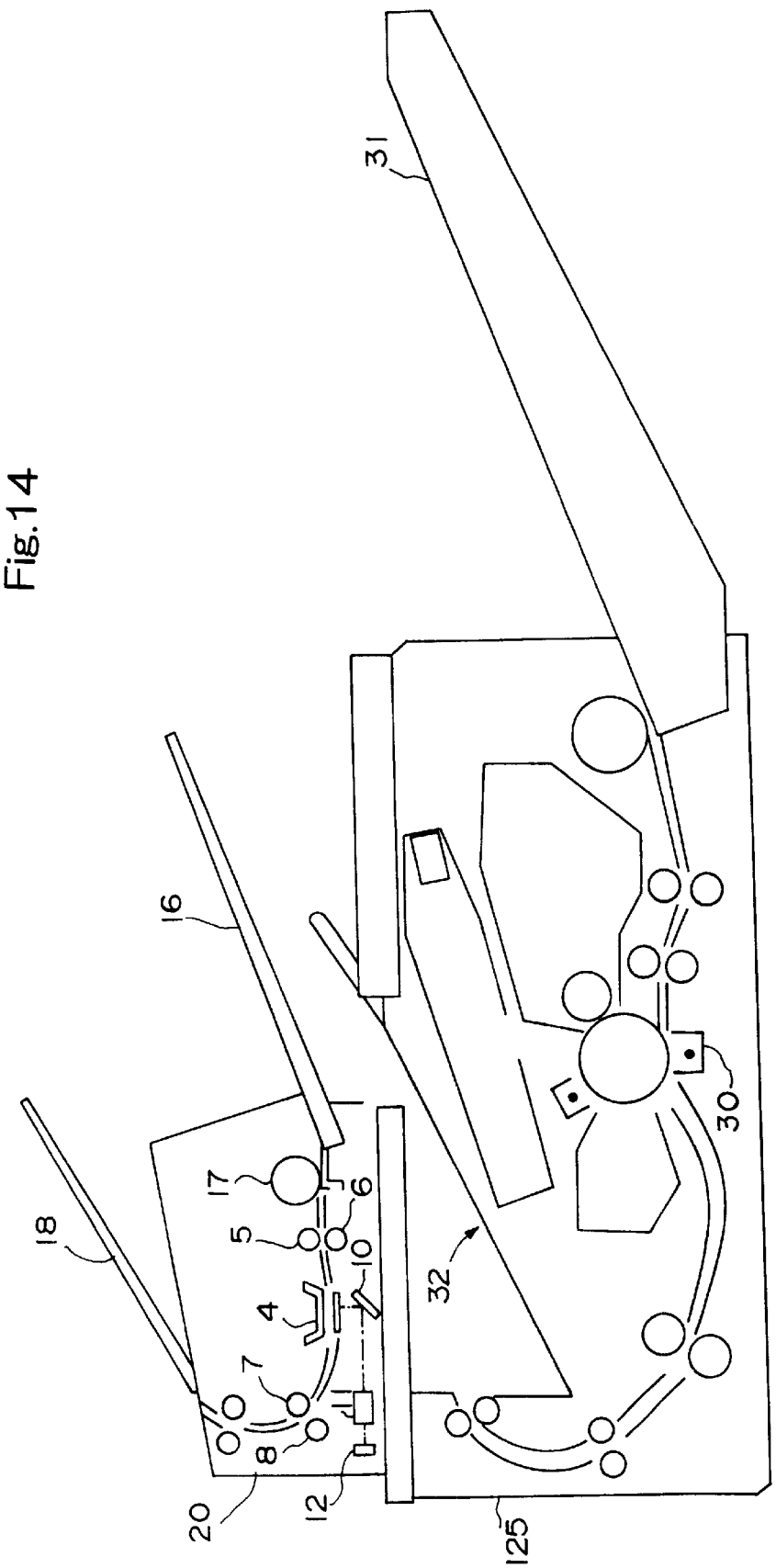
FIG. 14 is a view showing an image forming apparatus comprising the image reading apparatus of FIG. 1.

FIG. 14 is a view showing an image forming apparatus comprising the image reading apparatus of FIG. 1.

The reference numeral 20 denotes the image reading apparatus which, in addition to the configuration shown in FIG. 1, comprises an original stacking tray 16, a sheet supply roller 17, and an original discharge tray 18. Plural originals stacked on the original stacking tray 16 is supplied one by one by the sheet supply roller 17, to be transported to the reading position. The transported original is subjected in the reading position to a process of reading an image, and then discharged onto the original discharge tray 18.

In the printing section 125, an image is formed on a sheet on the basis of an image data which is read by the image reading apparatus 20. Sheets are supplied one by one from a sheet supply tray 31, an image is formed on the sheet by an image forming section 30, and the sheet is then discharged to a discharging section. As the image forming section, an electrostatic printer using the laser exposure system is shown as an example. Alternatively, the image forming section may be configured by an electrostatic printer based on LED exposure, or an ink jet printer.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image reading apparatus which reads each of originals that are sequentially transported one by one, the image reading apparatus comprising:

a reading unit which reads a transported original;

a reference member;

detecting means for detecting dirt in the reading unit by reading the reference member; and determining means for, among plural originals read by the reading unit, determining one or more originals on the basis of a detection result of the detecting means, image data which are read from the determined originals being affected by the dirt.

2. An image reading apparatus as claimed in claim 1, further comprising:

a display device which displays information identifying the originals that are determined by the determining means.

3. An image reading apparatus as claimed in claim 1, further comprising:

a rereading controller which rereads the determined originals.

4. An image reading apparatus as claimed in claim 3, wherein the rereading controller replaces image data of the determined originals which are stored in a memory with image data which are obtained by the rereading.

5. An image reading apparatus as claimed in claim 1, further comprising:

a discharging mechanism which discharges the determined originals in distinction from other originals.

6. An image reading apparatus as claimed in claim 1, wherein said detecting means performs the dirt detection each time when reading of one original is ended.

7. An image reading apparatus as claimed in claim 1, wherein said detecting means detects the dirt on an original glass plate of the reading unit.

8. An image forming apparatus having the image reading apparatus as claimed in claim 1, the image forming apparatus including:

a printer which prints an image data which is read from an original, wherein said printer prints information relating to the originals which are determined by the determining means.

9. An image reading apparatus which reads each of originals that are sequentially transported one by one, the image reading apparatus comprises:

a reading unit which reads a transported original in a reading position;

a reference member;

detecting means for detecting dirt in the reading unit by reading the reference member; and a rereading controller which changes the reading position of the reading unit on the basis of a detection result of the detecting means, and rereading an original that has been once read.

10. An image reading apparatus as claimed in claim 9, further comprising:

a transporting mechanism for transporting the original that has been once read to a position where the original situated before the reading, wherein said rereading controller controls the transporting mechanism to transport the original on the basis of the detection result, and rereads the original after the original is transported.

11. An image reading apparatus as claimed in claim 9, further comprising:

a transporting mechanism for transporting the original that has been once read to a position where the original situated before the reading, wherein said rereading controller controls the transporting means to transport the original on the basis of the detection result, performs rereading while transporting the original, and rotates an image data which is read from the original.

12. An image reading apparatus as claimed in claim 9, wherein said detecting means performs the dirt detection each time when reading of one original is ended, and, when the detecting means detects dirt, said rereading controller rereads an original which has been read immediately before the detection.

13. An image reading apparatus as claimed in claim 9, wherein said detecting means detects the dirt on an original glass plate of the reading unit.

14. An image forming apparatus having the image reading apparatus as claimed in claim 9, the image forming apparatus including:

a printer which prints an image data which is read from an original.

15. An image reading method of reading images on originals, comprising the steps of:

reading originals that are sequentially transported by a reading unit;

detecting dirt in the reading unit by reading a reference member;

determining one or more originals among plural originals based on a detection result of the detection step, image data which are read from the determined originals being affected by the dirt; and rereading the determined original.

16. An image reading method as claimed in claim 15, further comprising the step of:

displaying information identifying the originals that are determined by the determining step.

17. An image reading method of reading images on plural originals, comprising the steps of:

reading originals that are sequentially transported at a reading position of a reading unit;

detecting dirt in the reading unit by reading a reference member; and changing the reading position of the reading unit on the basis of a detection result of the detecting step, and rereading the original that has been once read at the changed reading position.

* * * * *